No. 740,441.

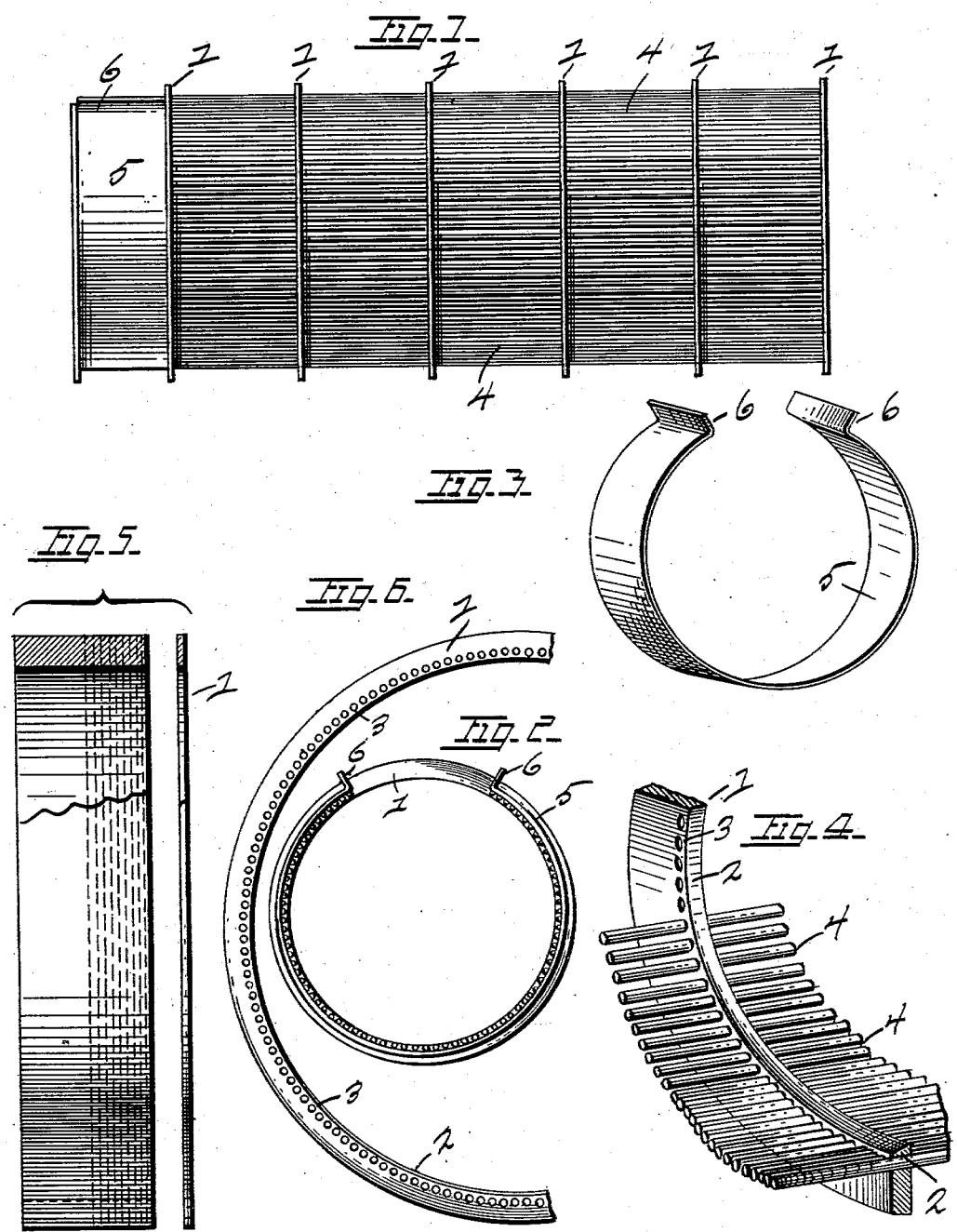

Patented October 6, 1903.

UNITED STATES PATENT OFFICE.

EDWARD J. KESSLER, OF TOLEDO, OHIO.

SCREEN FOR FRUIT-WASHING MACHINES.

SPECIFICATION forming part of Letters Patent No. 740,441, dated October 6, 1903.

Application filed July 20, 1903. Serial No. 166,272. (No model.)

*To all whom it may concern:*

Be it known that I, EDWARD J. KESSLER, of Toledo, county of Lucas, and State of Ohio, have invented certain new and useful Improvements in Screens for Fruit-Washing Machines; and I do hereby declare that the following is a full, clear, and exact description of the invention, which will enable others skilled in the art to which it appertains to make and use the same, reference being had to the accompanying drawings, and to the figures of reference marked thereon, which form part of this specification.

This invention has reference to an improved screen for fruit-washing machines of the class employing a wire cylinder adapted to inclose a rapidly-rotating agitator. These machines are at present in extensive use for washing fruit, and especially raisins. When raisins in bulk are received from the grower, they are intermixed with a considerable quantity of foreign material, it being a common occurrence to find nails therein, these falling into the raisins accidentally in packing them for shipment. The screens at present constructed for use in washing-machines are made of a series of wires extending lengthwise of the screen and formed at intervals with loops, through which are passed round circumferential wires, by which the cylinder formed by the longitudinal wires is held together. Since the longitudinal wires are woven upon the circumferential wires, they become loosened in time from the agitation of the fruit and foreign material within the screen, causing enlarged spaces to be formed between them, permitting the passage of raisins therethrough, the same being carried with the wash-water into the sewer. In this manner a considerable quantity of fruit is lost without being known to the operator of the machine. Since the longitudinal wires are of necessity of small gage to permit them to be woven, the milling action upon the raisins in contact therewith is greatly increased, the skin of the raisins being broken, permitting the natural juices to exude and form a sticky mass, which latter is transformed into a sugar of crystallization, which when present in packed raisins greatly impairs the market value thereof.

By employing the construction herein described I am enabled to employ wires of large gage, providing a screen of great rigidity and strength. I further provide means for retaining the mixed fruit and water upon their first entrance into the screen, permitting the fruit to be more thoroughly scrubbed, and consequently cleaned, than is possible in the screens of ordinary construction. To overcome the foregoing objection to the ordinary woven screen and to fulfil such objects as will herein appear, my invention is constructed; and it consists in the novel combination and arrangement of the parts hereinafter shown, described, and claimed.

In the drawings, Figure 1 is an elevation showing my improved screen. Fig. 2 is a view looking at one end of the same, showing the retaining-band in position, the ring immediately adjoining the retaining-band being removed. Fig. 3 is a perspective view of the retaining-band removed from the screen proper before being soldered thereto. Fig. 4 is an enlarged perspective in detail, showing the arrangement of the longitudinal wires of the screen with relation to the supporting-rings. Fig. 5 is an elevation, partly in section, of a cylinder of metal, and the same figure also discloses a ring cut therefrom, this being the first step in the construction of the screen. Fig. 6 is a front elevation of one of the supporting-rings, a portion thereof being broken away.

In the construction of my screen I employ a plurality of flattened rings 1, this form being best capable of resisting the pressure from within when the fruit is being violently agitated. To insure uniformity in the size of these rings, I first turn up a cylinder of metal, preferably malleable iron or brass, so that the inner and outer surfaces thereof will be perfectly true, and I then cut the rings therefrom, as shown in dotted lines, Fig. 5. The inner face of each ring is slightly tapered, as indicated at 2, before being cut off from the cylinder. Closely adjoining the inner tapered faces of the rings are drilled equidistant holes 3, adapted to receive the hardened-steel wires 4. In assembling the screen the rings are spaced at equal distances apart to provide equal areas between them. At one end of the screen, between the end ring and the ring adjacent thereto, is provided a retaining-band 5, of sheet metal, the same being arranged to nearly encircle the screen, having an open segment at the top and the upturned ends 6 to receive the lower end of the feed-hopper of the machine. This retaining-band is preferably secured to the screen by soldering, the wires of the screen forming a roughened surface on the interior.

The fruit after being thoroughly mixed with water enters the screen through the opening provided at the top of the retaining-band and is then thoroughly agitated within the screen, preferably by means of a rapidly-rotating spiral agitator. If no means were provided for retaining the mixed fruit and water immediately upon its entrance into the screen, the water would be instantly separated from the fruit and pass out between the longitudinal wires, owing to the centrifugal action of the agitator. By means of the retaining-band which I provide on my improved screen the mixture of fruit and water is held together within the screen until the same has advanced to a point within the screen not inclosed by the retaining-band. In order to slightly obstruct the passage of the fruit through the screen, I have tapered the inner faces of the rings supporting the longitudinal wires. It is essential that the fruit be obstructed somewhat in its passage through the screen; otherwise the same would be passed through the screen too rapidly and not be thoroughly washed. The form shown offers the necessary obstruction without injury to the fruit. By constructing a screen as herein described I am enabled to use much larger wires than it is possible to employ in woven-wire screens, and owing to this fact the milling action upon the fruit is almost entirely eliminated.

From the foregoing it is apparent that the employment of my improved screen will greatly increase the efficiency of fruit-washing machines.

Having described my invention, what I claim, and desire to secure by Letters Patent, is—

1. A screen for fruit-washing machines formed of longitudinal wires and supporting-rings, and a retaining-band at one end of the screen having a segmental portion thereof cut away and provided with upturned ends, said band being soldered to the longitudinal wires to provide an inner roughened surface, substantially as described.

2. A screen for fruit-washing machines comprising a plurality of flattened rings provided with equidistant perforations and having their inner faces tapered, longitudinal wires inserted through the perforations in the rings, and a retaining-band soldered to the longitudinal wires at one end of the screen between adjacent rings, said band having a segmental portion thereof cut away and having the ends thereof bent upward to facilitate the passage of fruit into the screen, substantially as described.

In testimony that I claim the foregoing as my own I affix my signature in presence of two witnesses.

EDW. J. KESSLER.

Witnesses:
CARL H. KELLER,
JO CUNNINGHAM.